US008274564B2

(12) United States Patent
Girgensohn et al.

(10) Patent No.: US 8,274,564 B2
(45) Date of Patent: Sep. 25, 2012

(54) INTERFACE FOR BROWSING AND VIEWING VIDEO FROM MULTIPLE CAMERAS SIMULTANEOUSLY THAT CONVEYS SPATIAL AND TEMPORAL PROXIMITY

(75) Inventors: Andreas Girgensohn, Palo Alto, CA (US); Anthony Eric Dunnigan, Berkeley, CA (US); Frank M. Shipman, III, College Station, TX (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1600 days.

(21) Appl. No.: 11/580,775

(22) Filed: Oct. 13, 2006

(65) Prior Publication Data

US 2008/0088706 A1   Apr. 17, 2008

(51) Int. Cl.
*H04N 7/18* (2006.01)
(52) U.S. Cl. .................... 348/159; 348/143; 715/243
(58) Field of Classification Search .................. 348/143, 348/159
See application file for complete search history.

(56) References Cited

U.S. PATENT DOCUMENTS

| 2002/0075572 A1 | 6/2002 | Boreczky et al. |
| 2005/0069225 A1 | 3/2005 | Schneider et al. |
| 2005/0071736 A1 | 3/2005 | Schneider et al. |
| 2006/0277470 A1 | 12/2006 | Schneider et al. |
| 2006/0279628 A1* | 12/2006 | Fleming ............ 348/143 |
| 2011/0032353 A1* | 2/2011 | Vallone et al. ........ 348/143 |

FOREIGN PATENT DOCUMENTS

JP   2000-261794 A   9/2000

OTHER PUBLICATIONS

A. Hsu et al; Content Browsing of Video Sequences; 1994; all pages.*
L Huston et al; Forensic Video Reconstruction, 2004; all pages.*
Arman, F., et al., "Content-based Browsing of Video Sequences," in Proc. ACM Multimedia 94, San Francisco, CA pp. 97-103 (Oct. 1994).

(Continued)

*Primary Examiner* — John Follansbee
*Assistant Examiner* — Glenford Madamba
(74) *Attorney, Agent, or Firm* — Morgan, Lewis & Bockius LLP (57) ABSTRACT

An interface and display of video from multiple fixed-position cameras is provided. A main video stream captured by a camera is selected to be the main video stream and is displayed to the interface. Video streams captured by the set of cameras and the main camera that are temporally related to the displayed main video stream are selected, including playback positions from one or more of a first segment of time in each of their respective video streams at the time of the main video stream, a second segment of time in each of their respective video streams prior to the time of the main video stream, and a third segment of time in each of their respective video streams after the time of the main video stream. The selected video streams are displayed to the interface in temporal relation to the display of the main video stream.

39 Claims, 7 Drawing Sheets
(7 of 7 Drawing Sheet(s) Filed in Color)

OTHER PUBLICATIONS

Ardizzone, E., et al., "An Integrated Architecture for Surveillance and Monitoring in an Archaeological Site," Proc., ACM Workshop on Video Surveillance and Sensor Networks, Singapore, pp. 79-85 (Nov. 11, 2005).

Atrey, P.K., et al., "Timeline-based Information Assimilation in Multimedia Surveillance and Monitoring Systems," Proc. ACM Workshop on Video Surveillance and Sensor Networks, Singapore, pp. 103-112 (Nov. 11, 2005).

Cheung, S.-C., et al., "Robust Techniques for Background Subtraction in Urban Traffic Video," Video Communications and Image Processing, SPIE Electronic Imaging, San Jose, 12 pages (Jan. 2003).

Cucchiara, R. "Multimedia Surveillance Systems," Proc. ACM Workshop on Video Surveillance and Sensor Networks, Singapore, 8 pages (Nov. 11, 2005).

Daniel, G., et al., "Video Visualization," Proc. IEEE Visualization 2003, Seattle, WA, pp. 409-416 (Oct. 19-24, 2003).

Huston, L., et al, "Forensic Video Reconstruction," Proc. ACM Workshop on Video Surveillance and Sensor Networks, 8 pages (Aug. 2004).

Iannizzotto, G., et al., "A Multimodal Perceptual User Interface for Video-Surveillance Environments," Proc. Conference on Multimodal Interfaces, Trento, Italy, pp. 45-52 (Oct. 4-6, 2005).

Korshunov, P. et al., "Critical Video Quality for Distributed Automated Video Surveillance," Proc. ACM Multimedia, Singapore, pp. 151-160 (Nov. 6-11, 2005).

Lipton, A.J., et al., "Critical Asset Protection, Perimeter Monitoring, and Threat Detection Using Automated Video Surveillance," ObjectVideo, downloaded from http://www.objectvideo.com/objects/pdf/products/vew/OV_WP_IVS.pdf, Reston, VA, 11 pages (Sep. 22, 2006).

Lipton, A.J., "Intelligent Video Surveillance in Crowds," ObjectVideo, downloaded from http://www.objectvideo.com/objects/pdf/products/vew/OV_WP_FlowControl.pdf, Reston, VA, 10 pages (Sep. 22, 2006).

Pillai, P., et al., "Multi-Fidelity Storage," Proc. ACM Workshop on Video Surveillance and Sensor Networks, New York, NY, pp. 72-79 (Oct. 15, 2004).

Lipton, A.J. "ObjectVideo Forensics: Activity-Based Video Indexing and Retrieval for Physical Security Applications," ObjectVideo, downloaded from http://www.objectvideo.com/objects/pdf/products/vew/OV_WP_Forensics.pdf, Reston, VA, 18 pages (Sep. 22, 2006).

"Object Video VEW," ObjectVideo, http://www.objectvideo.com/objects/pdf/products/vew/ObjectVideo_VEW.pdf, 2 pages (Sep. 22, 2006).

"Object Video Vew Product Capabilities," ObjectVideo, http://www.objectvideo.com/products/vew/capabilities/, 2 pages (Sep. 22, 2006).

Sebe, I.O., et al., "3D Video Surveillance with Augmented Virtual Environments," Proc. ACM Workshop on Video Surveillance and Sensor Networks, Berkeley, CA, pp. 107-112 (Nov. 7, 2003).

Wang, G. et al., "Real-Time Surveillance Video Display with Salience," Proc. ACM Workshop on Video Surveillance and Sensor Networks, Singapore, pp. 37-43 (Nov. 11, 2005).

Wang, J., et al., "Experiential Sampling for Video Surveillance," Proc. ACM Workshop on Video Surveillance and Sensor Networks, Berkeley, CA, 10 pages (Nov. 7, 2003).

Wu, G., et al., "Multi-camera Spatio-temporal Fusion and Biased Sequence-data Learning for Security Surveillance," Proc. ACM Multimedia, Berkeley, CA, 11 pages (Nov. 2-8, 2003).

Notice of Reasons for Refusal, Japanese Patent Application 2007-200524, Apr. 10, 2012, 5 pgs.

* cited by examiner

INTERFACE FOR BROWSING AND VIEWING VIDEO FROM MULTIPLE CAMERAS SIMULTANEOUSLY THAT CONVEYS SPATIAL AND TEMPORAL PROXIMITY

FIELD OF THE INVENTION

This invention relates generally to the field of video systems and more particularly to video surveillance systems.

BACKGROUND OF THE INVENTION

Video surveillance systems are common in commercial, industrial, and residential environments. A common surveillance activity is to keep track of people as they move from camera to camera, and in particular to keep track of important people or people exhibiting suspicious behavior. Security personnel need to identify activities of interest and determine interrelationships between activities in different video streams from multiple cameras at fixed locations. From these video streams, security personnel need to develop an understanding of the sequence of actions that led to or happened after a particular incident. For example, a video security system in an office building continuously records activity from multiple cameras. If an explosion occurred in the building, security personnel would be asked to analyze data from the video cameras to determine the cause of the explosion. This would require searching through hours of data from multiple cameras before the time of the explosion to determine the cause. For a video stream showing a person of interest from a main camera, other cameras into which a person may come into view are of interest to security personnel. These other cameras tend to be geographically near the main camera.

Further, large security installations can include dozens of security cameras. With the decreasing cost of video hardware, the number of video streams per installation is increasing. The limits of human attention and the number of video streams, however, constrain the cost efficiency and effectiveness of such systems. Further, it is often difficult to track activity between cameras because locations such as hallways in office buildings can look quite similar and do not indicate the spatial proximity of the cameras. Consequently, security personnel have great difficulty tracking activity across video streams. Hereinafter, the term "user" will be used instead of "security personnel" and includes but is not limited to security personnel.

Currently, identifying activity of interest within synchronized video streams from a set of security cameras is difficult due to the quantity of video, as well as the lack of authored metadata or indexing of the video streams. Currently, security video is normally observed and interacted with via a camera bank that shows available cameras. Current multi-channel video players generally have a bank of small video displays and a large video display. Users select cameras from the camera bank to track activity from one view to another. It is difficult for users to predict in which camera view a tracked person might appear after walking out of the main camera view. For many video players, the images in the camera bank tend to be small so that it is difficult for the users to locate and recognize a tracked person in those images.

What is needed is a system for monitoring video streams of a person moving in view of one camera to positions in view of other cameras. A way to select segments of video streams having the most activity is needed, as well as a way to select representative keyframes within these segments, where keyframes are frames or snap-shots of a point in time in the video streams. In particular, what is needed is a way to present video streams from a main camera along with video streams from other nearby cameras showing activity to facilitate the tracking of events of interest. A map is also needed to show a spatial view of the cameras, as well as video streams alongside the cameras on the map. In addition, what is needed is a way to present video streams from slightly before and after the time being viewed to aid users in determining where people came from and where they go to. Further, what is needed is way for users to browse video by quickly skipping to a different time in the same video stream or switching to another video stream to keep the activity in view. In addition, animation of the displays and map are needed to keep the user oriented when the user switches to another video stream.

SUMMARY OF THE INVENTION

An interface and display of video from multiple fixed-position cameras is provided. A main video stream captured by a camera is selected to be the main video stream and is displayed to the interface. Video streams captured by the set of cameras and the main camera that are temporally related to the displayed main video stream are selected, including playback positions from one or more of a first segment of time in each of their respective video streams at the time of the main video stream, a second segment of time in each of their respective video streams prior to the time of the main video stream, and a third segment of time in each of their respective video streams after the time of the main video stream. The selected video streams are displayed to the interface in temporal relation to the display of the main video stream.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Preferred embodiment(s) of the present invention will be described in detail based on the following figures, wherein.

DETAILED DESCRIPTION OF THE INVENTION

Identifying Activity in Video

In embodiments, two different approaches can be used for determining activity in video streams, and both approaches look at the changed foreground pixels in successive video frames. The first approach compares successive video frames and determines the pixels that change, whether or not in the foreground. By counting the number of pixels that change in successive frames, the higher the number, the more activity in the frames. The second approach models the background of the camera view and determines foreground pixels in every video frame. The second approach uses the foreground pixel information to determine the direction and speed of the overall motion.

For a given set of video streams from a given set of cameras, frames with an amount of activity above a threshold are grouped into video segments. In embodiments, for activity detection based on pixel changes for both the first and second approaches, a threshold between 2% and 5% of the total number of pixels in a video frame is used. The selection of this threshold depends on camera location, for example indoor or outdoor, and on the particular application. Each of those segments is subdivided into subsegments of equal length, for example ten seconds. In embodiments, the subsegments can be of any time length. Each subsegment is represented by a single keyframe, which is the frame within the subsegment that is determined to have the most activity, as described above. The representative keyframes for the subsegments are then candidates for selection for keyframe displays, discussed below.

Selection of Keyframes for Display Purposes

For display in a multi-camera video player, there are usually more keyframes available from a certain time segment of the video streams than there are available slots to display the keyframes. In embodiments, a subset of keyframes will be selected from a group of available keyframes based on any combination of the amount of activity in frames of the keyframe's corresponding video sequence, as described above, motion close to points of interest in the space being videotaped, and events from other techniques or sensors, for example infrared motion sensors, face detection, or radio frequency identification. For keyframe selection based on the amount of activity in frames of the keyframe's video sequence, the more activity or changes in pixels between adjacent frames, the more likely the keyframe from the video sequence will be selected for display. Keyframe selection based on motion close to points of interest can be computed by comparing the views of several cameras to determine the three-dimensional distance of motion from a point of interest. The shorter the distance of motion from the point of interest for a frame in the keyframe's video sequence, the more likely the keyframe from the video sequence will be selected for the display. Suppose keyframe selection is based on other techniques or sensors, for example a motion sensor. For cameras corresponding to the available keyframes, the more activity the motion sensor detects near a particular camera or the focal point of that camera during the time segment in question, the more likely the keyframe corresponding to that camera will be selected for the display.

Creating a Temporal Display

In embodiments, for a first type of multi-camera video player display, video streams from multiple camera views are selected and organized to display to the video player. The video streams are selected and organized primarily based on temporal relationships between the cameras. The video streams are organized secondarily based on geographic relationships between the cameras.

Figure 1:
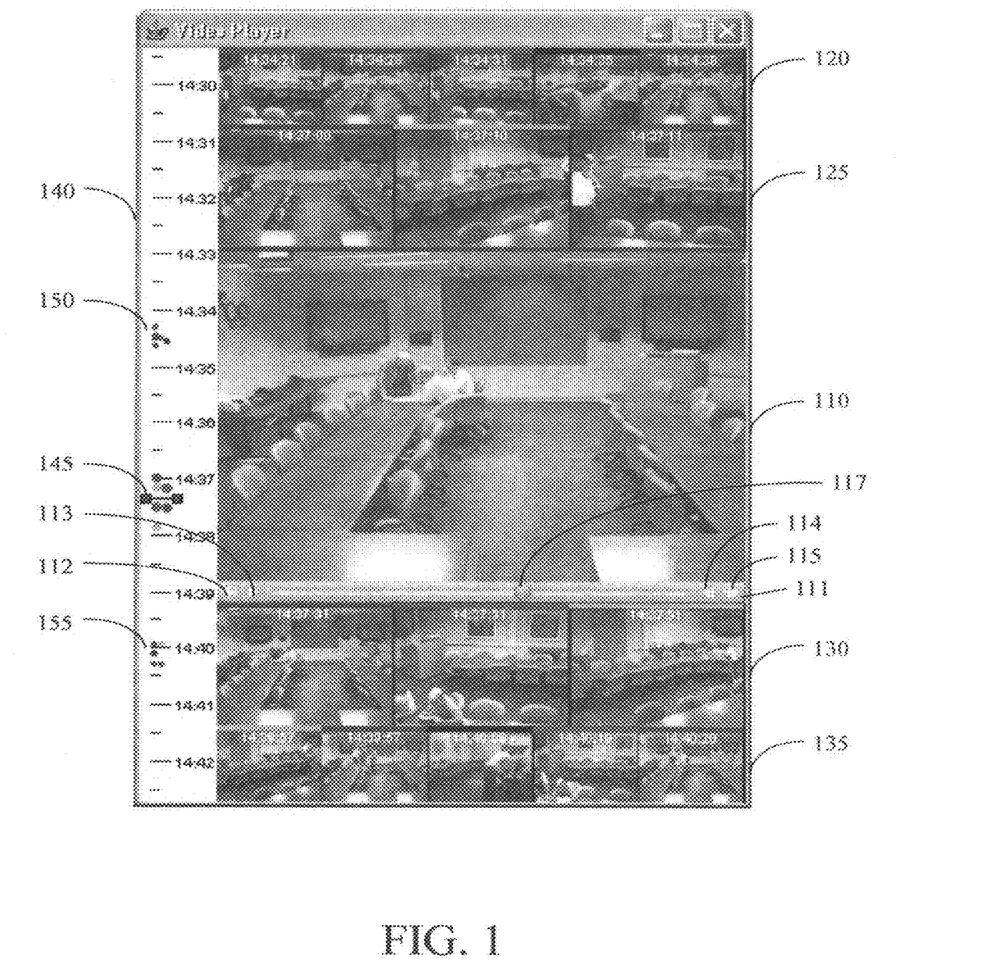
FIG. 1 shows an example temporal video player display showing a video stream from a main camera view and two bands each of past and future video streams of multiple camera views temporally related to the video stream from the main camera view, such that the video streams of the multiple camera views are from certain ranges of time, according to embodiments.

FIG. 1 shows an example temporal video player display showing a video stream from a main camera view and two bands each of past and future video streams of multiple camera views temporally related to the video stream from the main camera view, such that the video streams of the multiple camera views are from certain ranges of time, according to embodiments. A video stream display 110 from the view of a main camera is selected to be the main video played on the video player. This main video is either selected by a user or determined from detected events. In the latter case, detected events can be the video sequence having the most activity within a certain time period or at a certain time. Detected events can also be activity that occurs at a particular location of interest. For example, for a location such as a particular elevator, if an elevator-door event is detected at the particular elevator, video from the camera showing the elevator door can be selected as the main video.

Controls 111 of the video player are shown beneath the video stream display 110. These standard video player controls include but are not limited to sound on/off 112, play/stop 113, pause (not shown), rewind (not shown), fast-forward (not shown), step back 114, and step forward 115. The controls also include a playback point button 117, which a user drags left or right to find a position in the video stream. The controls may also include any of the controls shown in FIG. 3, described below. The point of the video stream currently playing on the display is the playback position, which is also shown by button 117. A timeline 140 to the left of the player also displays the playback position in time 145, shown by a blue bar with squares at either end. As shown in FIG. 1, the playback position time is approximately 14:37:20, or 2:37 and 20 seconds, P. M.

A group of cameras having video streams in temporal proximity to that of the main camera are chosen. From the group of cameras, a final set of cameras is chosen for display purposes by determining either close spatial proximity to the main camera of the playing video stream or by user selection. For FIG. 1, an example set of five cameras are chosen for display purposes. Video streams of these five cameras, including the main camera video stream, will be displayed in four horizontal bands shown in FIG. 1, two above and two below the main camera video stream display 110. The second band 125 and third band 130 show video streams from camera views that are between 0 and 30 seconds in the past and future, respectively, relative to the main camera video stream. The top band 120 and bottom band 135 show video streams from camera views that are between 30 seconds to 3 minutes in the past and future, respectively, relative to the main camera video stream. In embodiments, these ranges can be varied as desired.

The larger video streams nearer the main video stream are in the recent past and future relative to the main video stream. The smaller video streams farther from the main video stream indicate activity with a larger temporal distance in the past and future relative to the main video stream. Five camera view slots are assigned to first or top band 120 and to the fourth or bottom band 135. Three camera view slots are assigned to the second band 125 and to the third band 130. In embodiments, any fixed number of camera view slots, however, can be assigned to the different temporal bands. The main video stream and other video streams have colored bars on top to indicate the actual source cameras. The bar colors for the set of five cameras of FIG. 1 are red, pink, green, yellow, and blue, with blue being the bar color for the main camera. The times of the video streams are shown at the top of the video streams except the main video stream. In embodiments, the times can be shown at any position within the video stream displays. In embodiments, the main video stream also has the time shown at the top of the display of the video stream.

The timeline 140 displays colored dots for the times of the video streams. The dot colors correspond to the camera bar colors to show the point in time for each video stream. The dots are placed such that they do not overlap each other. Thus, the first band of video streams 120, showing times ranging from 14:34:21 to 14:34:38, are shown by colored dots 150 in the timeline 140. The second band of video streams 125, showing times ranging from 14:37:00 to 14:37:11, are shown by colored dots grouped above the playback position 145 in the timeline 140. The third band of video streams 130, showing times ranging from 14:37:31 to 14:37:51, are shown by colored dots grouped below the playback position 145 in the timeline 140. Finally, the fourth band of video streams 135, showing times ranging from 14:39:57 to 14:40:20 are shown by colored dots 155 in the timeline 140.

The refresh rate of the images in the video streams can be varied to produce effects ranging from almost fluid video playback to images that remain steady for seconds or even minutes. In embodiments where frame rates are low, for example less than on frame per second or more, video frames can be sampled at fixed intervals. In other embodiments where frame rates are low, keyframe selection becomes an issue. In embodiments, keyframes can be used either for performance reasons or because a keyframe can visualize an event better than a sequence of moving pictures.

Each band may have limited slots for video streams. For example for FIG. 1, the set of selected cameras contains five cameras, but band 125 displays only three video streams. In this situation, video streams are selected for display based on a selection of keyframes. First, a group of keyframes from subsegments of video streams of the set of five cameras are determined as described above. The time frame for the top band is 30 seconds to 3 minutes in the past relative to the main video stream. The top band 120 time period is approximately 14:34:20 to 14:36:50, relative to the playback position of 14:37:20. Thus, a subgroup of the group of keyframes is taken from the ten second subsegments within this 2 minutes 30 second time period. Keyframes to be displayed to the player are then selected from this subgroup as discussed above. Keyframes are selected from the pink camera, one from the red camera, one from the green camera, and two from the blue or main camera, and none from the yellow camera. The video streams corresponding to these five keyframes are then displayed in the top band 120. In embodiments, no video streams or keyframes from a particular camera in the set of cameras are displayed, and in other embodiments, two or more video streams or keyframes from the particular camera are displayed.

In embodiments, keyframes or video stream sample images can be displayed in the bands instead of video streams. Further, in embodiments, any combination of video streams, keyframes and sample images can be displayed in the bands. In addition, a keyframe or sample image from the main camera video stream can be displayed instead of the video stream in display 110. In embodiments, video streams from the main camera are not shown in the video stream of the bands.

In embodiments, any number of temporal bands may be shown on the display. In embodiments, the bands can vary in size, and any number of video streams, keyframes and sample images can be displayed in each band. In embodiments, the bands can be displayed vertically in columns from left to right, with a timeline displayed beneath the camera views. In embodiments, no timeline is displayed. The main video stream and other video streams can be displayed in any order or in any relation to each other. In embodiments, views from the various cameras can be distinguished in other ways than by color.

Figure 2:
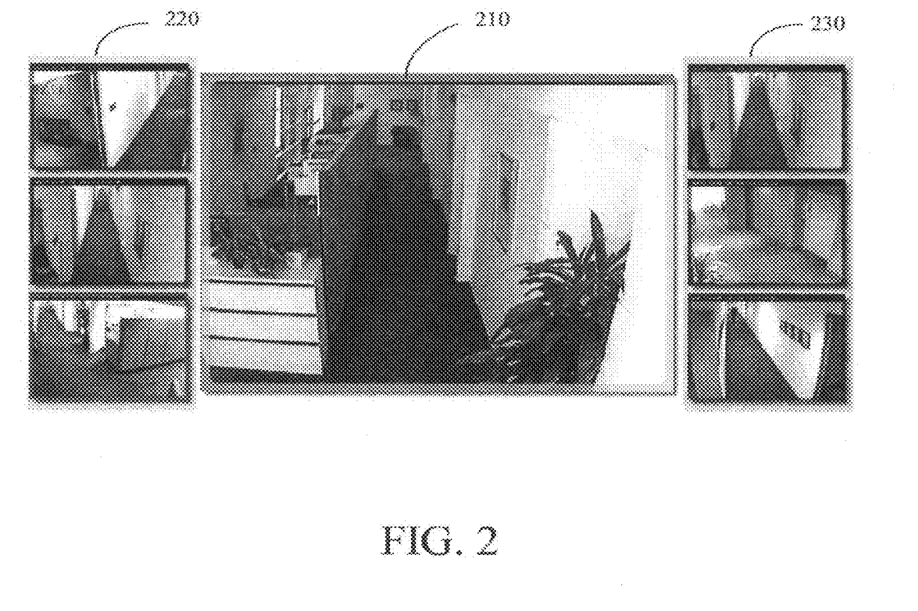
FIG. 2 shows an alternate example temporal video player display showing a video stream from a main camera view and one band each of past and future video streams from multiple camera views temporally related to the main camera video stream, such that the video streams from a certain time before and after the time of the main camera video stream are synchronized to remain displayed a fixed time period, according to embodiments.

FIG. 2 shows an alternate example temporal video player display showing a video stream from a main camera view and one band each of past and future video streams from multiple camera views temporally related to the main camera video stream, such that the video streams from a certain time before and after the time of the main camera video stream are synchronized to remain displayed a fixed time period, according to embodiments.

A video stream display 210 from the view of a main camera is selected to be the main video played on the video player. Controls of the video player are part of the video display (not shown). Two vertical bands of video streams 220 and 230 are displayed on either side of the main video stream display 210. A first band 220 to the left of the video stream display 210 shows three camera views that display video streams from five seconds prior to the time of the main video stream playing in display 210. A second band 230 to the right of the video stream display 210 shows three camera views that display video streams from five seconds after the time of the video stream playing in display 210. A three to ten second offset from the time of the main video stream display playing performs best for tracking people walking from camera view to camera view. In embodiments, this offset can be varied as desired. The refresh rate of images in these video streams can be varied to produce effects ranging from almost fluid video playback to images that remain steady for seconds or even minutes.

The cameras and images are chosen as above for FIG. 1. In FIG. 2, the main video stream and the other video streams have colored borders to indicate the actual source cameras. As an example, six cameras are chosen for the display, including the main camera. The border colors for the set of six cameras are red, dark blue, light blue, dark green, pink, and yellow, with yellow being the border color for the main camera.

In embodiments, the times of the video streams can be shown at the top of the video stream displays. The main video stream can also have the time shown at the top of the display of the video stream. The times can be shown at any position within the video stream displays. In embodiments, keyframes or sample images can be displayed in the bands instead of video streams. Further, any combination of video streams, keyframes and sample images can be displayed in the bands. In addition, a keyframe or sample image from the main camera video stream can be displayed instead of the video stream in display 210. In embodiments, video streams, keyframes and sample images from the main camera are not shown in the video streams, keyframes and sample images of the bands. In some cases, no video streams, keyframes or sample images from a particular camera in the set of cameras are displayed, and in some cases, two or more video streams, keyframes or sample images from the particular camera are displayed.

In embodiments, any number of temporal bands may be shown on the display in order to display video streams from other fixed periods prior to and after the time of the main video stream display 210. In embodiments, the bands can vary in size, and any number of video streams, keyframes and sample images can be displayed in each band. In embodiments, the bands can be displayed horizontally in rows from top to bottom. The main video stream display and video streams can be displayed in any order or in any relation to each other. In embodiments, views from the various cameras can be distinguished in other ways than by color.

Creating a Spatial Display

In embodiments, for a second type of multi-camera video player display, video streams from multiple camera views are selected and organized primarily based on geographic or spatial relationships between the cameras. The video streams are organized secondarily based on temporal relationships between the cameras. The advantage of this type of camera display is that a person shown leaving one camera view in a particular direction is likely to appear in another camera view of a camera placed in that direction.

Figure 3:
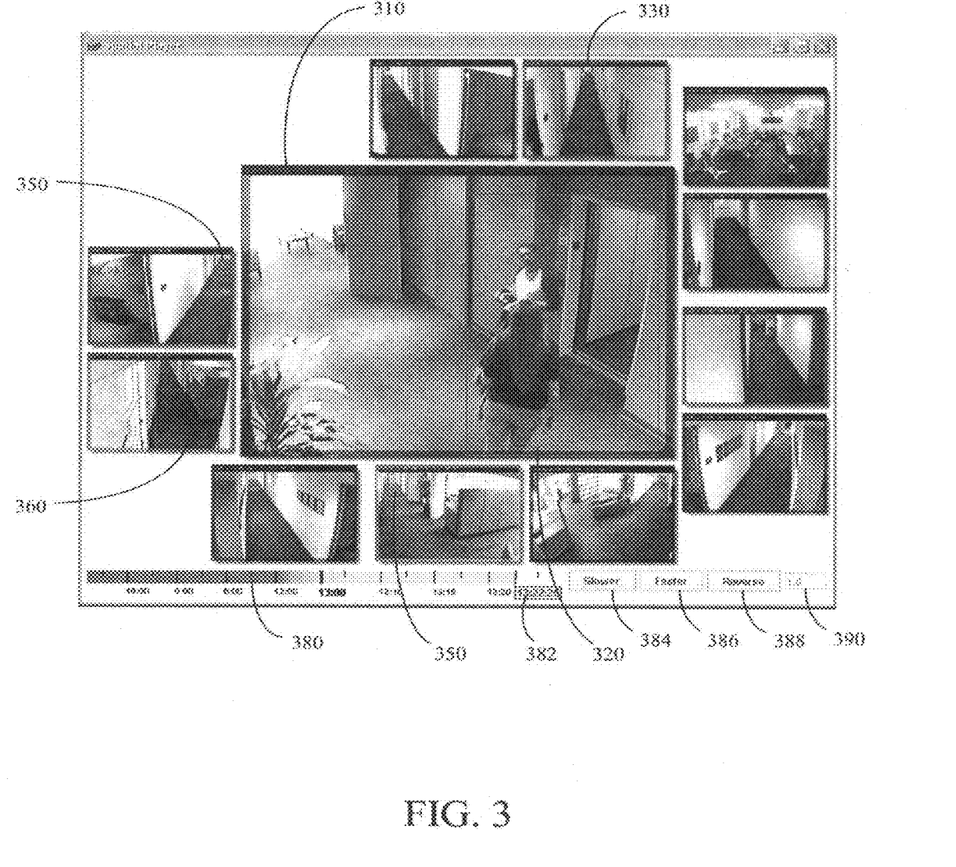
FIG. 3 shows an example spatial video player display showing a video stream from a main camera view surrounded by video streams from cameras in spatial proximity to the main camera, according to embodiments.

FIG. 3 shows an example spatial video player display showing a video stream from a main camera view surrounded by video streams from cameras in spatial proximity to the main camera, according to embodiments. The player layout is similar to that of the temporal displays shown in FIGS. 1 and 2. A video stream display 310 is selected to be the main video played on the video player. This main video is either selected by a user or determined from detected events. In the latter case, detected events can be the video sequence having the most activity within a certain time period or at a certain time. Detected events can also be activity that occurs at a particular location of interest. For example, for a location such as a particular elevator, if an elevator-door event is detected at the particular elevator, video from the camera showing the elevator door can be selected as the main video.

Rather than displaying all available camera views in a bank, a group of cameras are chosen that are in close spatial proximity to the main camera. From the group of cameras, a final set of cameras is chosen for display purposes by determining if they have video streams in temporal proximity to that of the main camera. The refresh rate of the images in displayed video streams can be varied to produce effects ranging from almost fluid video playback to images that remain steady for seconds or even minutes. In embodiments where frame rates are low, for example less than on frame per second or more, video frames can be sampled at fixed intervals. In other embodiments where frame rates are low, keyframe selection becomes an issue. In embodiments, keyframes can be used either for performance reasons or because a keyframe can visualize an event better than a sequence of moving pictures.

In embodiments, keyframes can be displayed surrounding the main video stream display. If the temporal proximity is set to zero then keyframes are selected from real-time video streams of the set of cameras when the keyframes are updated. Otherwise, keyframes are selected for display as described above. The refresh rate of the keyframes can be varied to produce effects ranging from almost fluid video playback to images that remain steady for seconds or even minutes.

In FIG. 3, the main video stream and other video streams have colored borders to indicate the actual source cameras. As an example, twelve cameras are chosen for the display, including the main camera. The border colors for the set of twelve cameras are navy blue, light pink, light blue, red, orange, royal blue, dark green, yellow, purple, tan, dark pink, and light green, with light green being the border color for the main camera color.

The video streams are placed around the main video stream such that a person walking out of the field of view of a first camera will likely appear in the field of view of an adjacent second camera, where the video stream of the second camera in the video display is in the same direction from the first camera as the direction in which the person walked out of the field of view of the first camera. A main video stream 310 shows two people shown with a red box around them. This red box designates an area of activity or an area of potential interest or where activity was found. This area can be seen in other video streams 330, 350, 360 and 370, for example. In embodiments, these red boxes are not shown.

The video player of FIG. 3 also has a timeline 380, showing the playback position time 382 for the video stream of the main camera 310. The controls of the player include but are not limited to slower 384, faster 386 and reverse 388. The current speed of the video playback 390 is shown as 1.0. Current speed 390 of a higher number indicates fast-forward, and a negative number indicates reverse playback. The player can have any of the controls shown above for FIG. 1.

Video streams are displayed surrounding the main video stream at angles that are calculated from the video streams' cameras physical locations relative to the main camera. The view direction shown in the video stream of the main camera points to the top of the display. Ideally, the angle from the center of the main camera video stream to the center of a video stream would be the same as the angle between the main camera and camera corresponding to the video stream. Naively, one could just determine the angle from the main camera to second camera and place the video stream from the second camera in that direction on the display. However, this does not take into consideration that cameras show activity some distance away from the camera position. Instead of using the angle between the physical positions of the main camera and second camera, the angle between the two cameras' focal points is used to determine the second camera's video stream position in the display.

Figure 4:
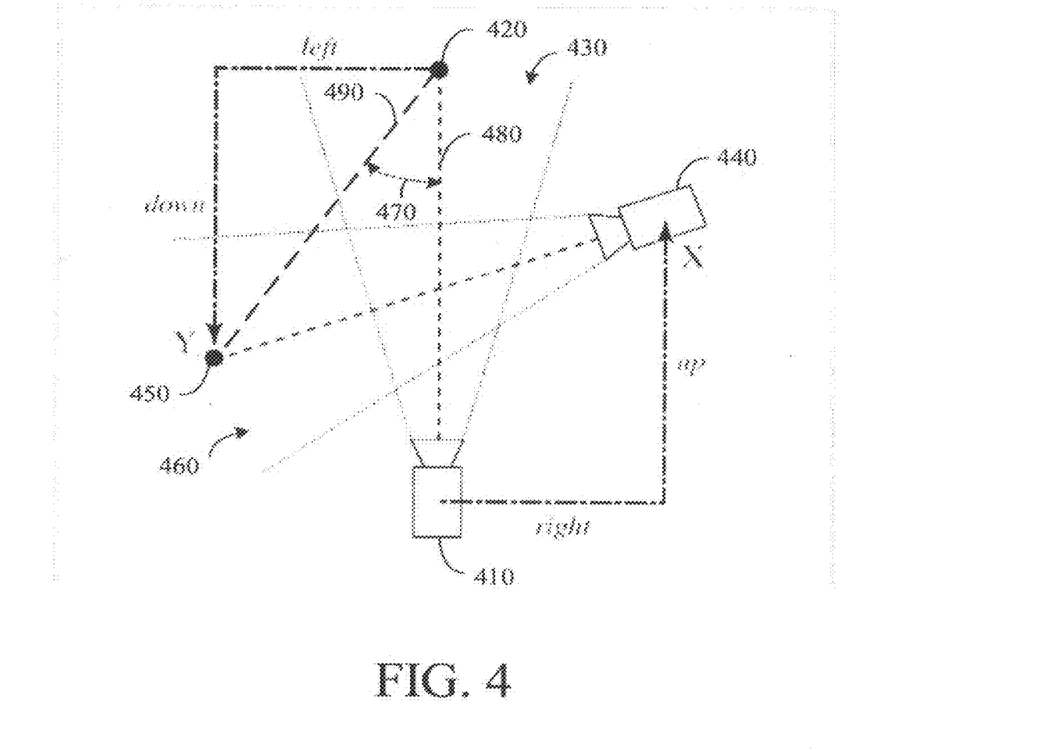
FIG. 4 illustrates the angle between focal points of two cameras, according to embodiments.

FIG. 4 illustrates the angle between focal points of two cameras, according to embodiments. Focal points of varying distances can lead to very different placements of video streams on the display in relation to the main video stream display. A main camera 410, has a focal point 420 and a field of view 430. A second camera 440 has a focal point 450 and a field of view 460. If the angle between physical camera positions was used to determine the angle of a displayed video stream in relation to the main video stream display, the video stream from camera 420 would be placed to the "right" and "up" from the main camera 410 video stream display, and as shown by "X" in FIG. 4.

With the use of focal points 420 and 450, the video stream from camera 420 is instead placed to the "left" and "down" from the main camera 410 video stream display, and as shown by "Y" in FIG. 4. Described another way, the angle for the camera 420 video stream display is the angle 470 formed by line 480 from the main camera 410 to the main camera focal point 420 and line 490 from the main camera focal point 420 and the second camera focal point 450. This video stream placement is correct because somebody walking out of the left side of the field of view of the main camera 410 will still be visible in the view of camera 440.

This approach is most advantageous for adjacent cameras that might have overlapping views. Since this task can be performed automatically, this approach allows for later repositioning of individual cameras without affecting many video stream display positions. Further, this approach also scales up to more cameras.

For determining relative physical camera placements, a focal point between 10 and 20 feet away from the camera works well for office buildings and other personal tracking applications, such as airports, for example. Parking lot cameras, for example, would need varying focal lengths, depending on the size of the lot. A camera's focal point needs to be moved closer to the camera for wide-angle lenses. The following formula shown in Eqn. 1 determines distances d to the focal point with respect to the camera view angle α to keep the relative size of an object at the focal point constant:

$$d_1 \tan\frac{\alpha_1}{2} = d_2 \tan\frac{\alpha_2}{2} \qquad \text{Eqn. 1}$$

For example, if a focal length of 20 feet is used for a camera with a view angle of 48 degrees, a focal length of 7.47 feet should be used for a camera with a view angle of 100 degrees because tan(48/2)=tan(24)=0.445, tan(100/2)=tan(50)= 1.192, and therefore (20*tan(48/2))/tan(100/2)=7.47. Typically, a camera view angle α is 48 degrees for a normal lens and 100 degrees for a wide angle lens.

In FIG. 3, to fit more video streams onto the video display, the angles between the main camera video stream and the other video streams can be adjusted up or down to a certain amount. A least square measure of the angle errors can determine the best placement of video streams on the display. For example, if a video stream cannot be placed on the display within a certain error, for example 45 degrees, the number of displayed video streams needs to be reduced to maintain the spatial orientation between the video streams and the main camera video stream.

Video streams from cameras closest to the selected camera are included in the display. If there are more cameras in the set of cameras than available positions for video streams, then keyframes from the closest cameras are selected in the same manner described above for FIG. 1, and video streams corresponding to these keyframes are displayed. Selecting the closest cameras, however, requires more information than taking the Euclidian distance between cameras. For example, Euclidian distance does not properly reflect the time a person takes to walk from one camera to another in an office building, for example, as walls and hallways may separate the cameras. Instead, a city block distance, which can be determined by the sum of horizontal and vertical distances, produces more accurate results. For multi-floor buildings, one should consider the locations of elevators and stairs. For cameras on different floors, distance between cameras can then be determined as the combined distance to and from the nearest elevator/stairs at the respective floors, plus some time for riding the elevator.

Further, the use of focal points is used to determine distances between cameras, in order to determine the spatial closeness of cameras to the main camera, as cameras that share a field of view and point toward each other to varying degrees should be favored as spatially close, as opposed to cameras that are near each other but not pointed toward each other. For a pair of cameras, we select four different focal points for each camera. For example, distances of 5, 10, 20, and 40 feet from each camera are selected. The average of the distances between corresponding focal points of two cameras is used as the distance between those cameras. Using this average emphasizes pairs of cameras that share a field of view by pointing at or toward each other without neglecting cameras that are nearby each other that do not share a field of view. An example can be seen in FIG. 6, where the video stream from a camera 692 at the top right corner of a map is included in the display on the map because the camera points toward a main camera 640 on the lower right corner of the map. A video streams from the camera 694 just below the camera 692 on the map, however, is not included on the map because it points away from the main camera 640.

In embodiments, a different set of focal point distances can be used for different building architectures and camera mount positions. In embodiments, any number of different focal lengths can be used in the calculation. In embodiments, the times of the video streams can be shown at the top of the video stream displays. The times can be shown at any position within the video stream displays. The main video stream can also have the time shown at the top of the display of the video stream. In embodiments, views from the various cameras can be distinguished in other ways than by color.

In embodiments, keyframes or sample images from the set of cameras can be displayed instead of video streams. Further, any combination of video streams and keyframes can be displayed. In addition, a keyframe or sample image from the main camera video stream can be displayed instead of the video stream in display 310. In some cases, no video streams, keyframes or sample images from a particular camera in the set of cameras are displayed, and in some cases, two or more video streams, keyframes or sample images from the particular camera are displayed.

Figure 5:
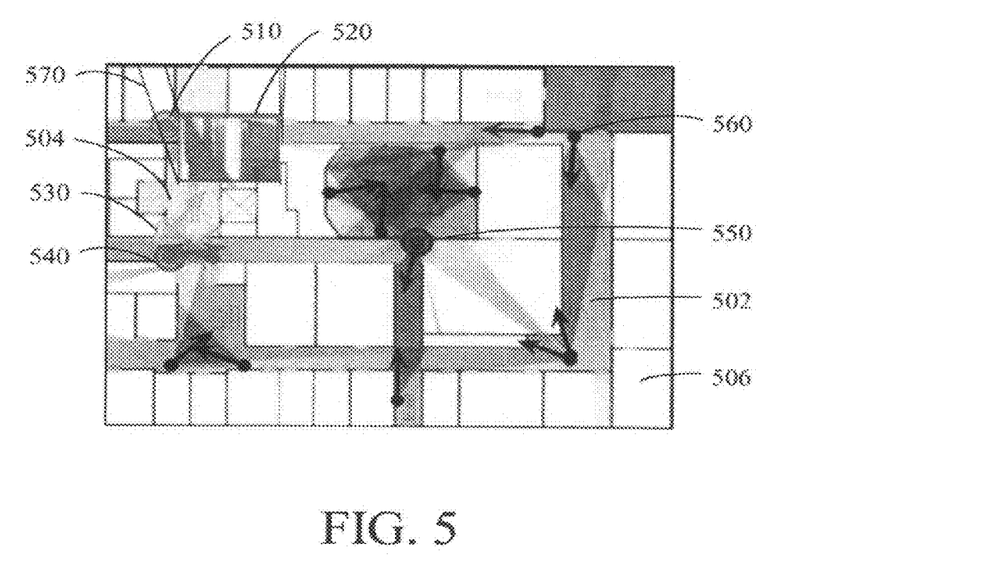
FIG. 5 illustrates an alternate example spatial video player display of a map of camera positions that shows one of the video streams from the multiple camera views near the corresponding camera position on the map, according to embodiments.

FIG. 5 illustrates an alternate example spatial video player display of a map of camera positions that shows one of the video streams from the multiple camera views near the corresponding camera position on the map, according to embodiments. The map shows an office building floor with hallways 502, common areas 504, as well as offices and other rooms 506. The cameras are color coded on the map. For a camera 510, a corresponding video streams 520 is displayed near the camera 510. The same pink color used for camera 510 is used as the border for video stream 520 to tie the camera and corresponding video stream displays together. Three other cameras were selected for this display, red camera 540, yellow camera 530 and blue camera 550. For all cameras on the map, including those not selected for display such as camera 560, a camera's location is shown as a dot on the map, while the camera's field of view is shown as a shaded area. Further, a camera's view direction is emphasized and indicated by an arrow. The four cameras selected for the display are emphasized by displaying their dots with circles around them, by color coding their dots, circles and arrows. Although not shown in FIG. 5, the main camera is further emphasized by enlarging its dot, arrow and field of view.

In embodiments, lines 570 connect video stream 520 to a main video stream display (not shown) to show that the video stream for pink camera 510 has been selected to be the new main camera displayed. To indicate the camera 510 was selected, its corresponding video stream 520 fades in, the lines 570 extends to the main video stream display (not shown), and video stream 520 becomes the main video display. Lines 570 and video stream 520 then fade out to show a new camera was selected.

While this kind of a display in FIG. 5 maintains the spatial orientation between cameras better than the display of FIG. 3, it accommodates fewer camera views, or video streams, of the same size in the same display area. Also, the more abstract placement of cameras in the display of FIG. 3 helps with the tracking of people across cameras.

Figure 6:
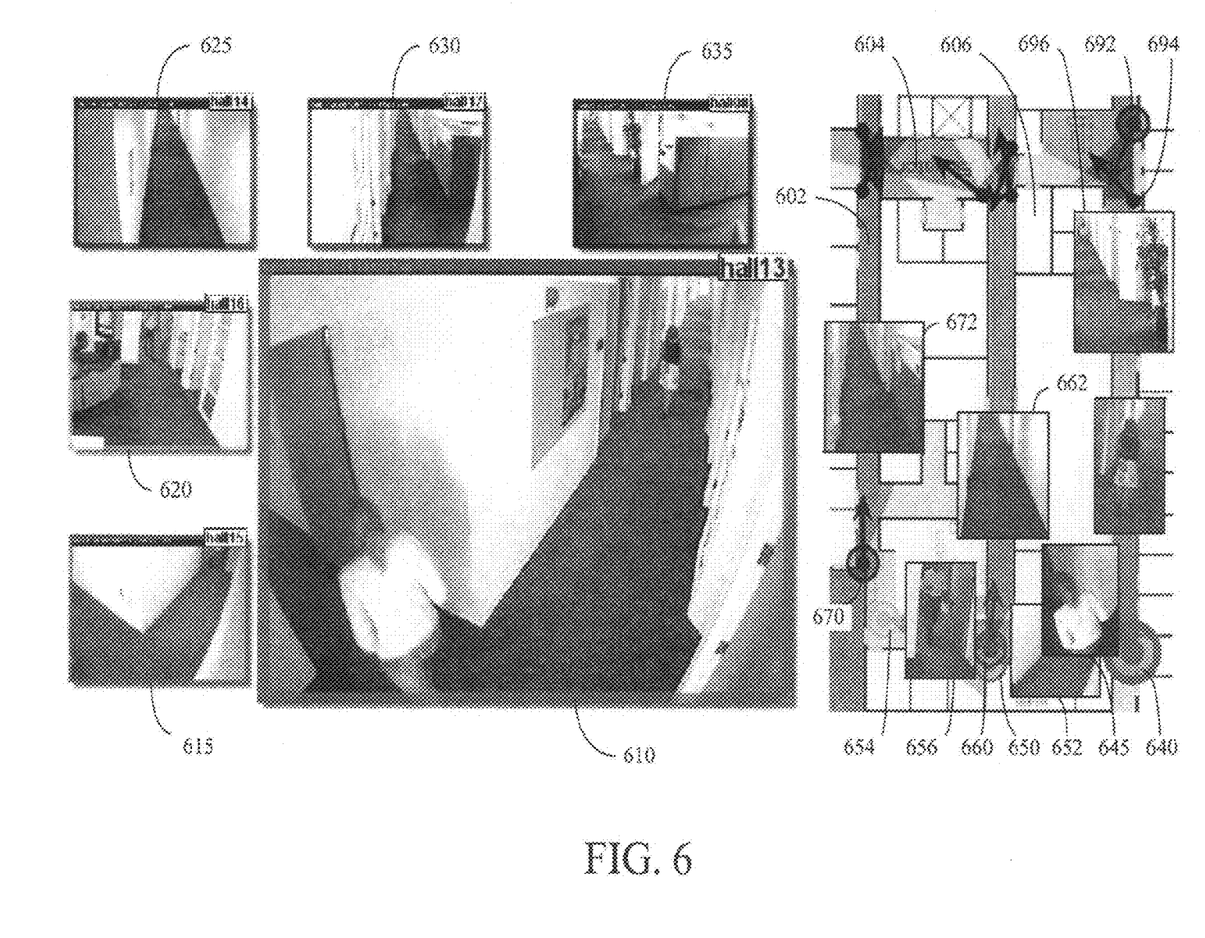
FIG. 6 shows an example spatial video player display similar to that shown in FIG. 3 alongside a map display of camera positions similar to that shown in FIG. 5, according to embodiments.

In embodiments, the video stream from the main camera can be displayed separately near the map or on the map near the main camera. In embodiments, multiple video streams or no video streams are displayed to the map. In embodiments, keyframes or sample images can be displayed to the map instead of video streams. In embodiments, cropped keyframes, images or video streams can be displayed to the map. In embodiments, the map can be displayed alongside either the temporal or the spatial video player displays, as shown in FIG. 6 discussed below. In embodiments, any combination of dots, circles, arrows, shading, color coding, enlarging or other types of distinguishing marks can be used to indicate or emphasize cameras on the map. In embodiments, video streams can be distinguished in other ways than by color.

FIG. 6 shows an example spatial video player display similar to that shown in FIG. 3 alongside a map display of camera positions similar to that shown in FIG. 5, according to embodiments. The spatial video player is shown on the left, and the map display is shown on the right. The spatial video player depicts the view of a camera and the arrangement of nearby camera views that can be reached by walking down either of two hallways. The map in FIG. 6 illustrates where those nearby cameras are physically located and shows partial views from those cameras. The map shows an office building floor with hallways 602, common areas 604, as well as offices and other rooms 606. In the main video stream display 610, the woman shown at the left already has one foot visible in the camera view to her left, shown in video stream 615. She could turn right to appear in the camera view shown in the top left video stream 625 or continue in a straight line to appear in the camera view shown in the center left video stream 620. The other woman shown in the main video stream display 610 is already partially visible in the distance of the camera view shown in the top right video stream 635. The remaining camera view shown in video stream 630 is placed in the correct direction but it could only be reached by walking through two interim camera views because of walls blocking a more direct path.

In the video player display, the main video stream and the other video streams have colored borders to indicate the actual source cameras. As an example, six cameras are chosen for the display, including the main camera. The border colors for the set of six cameras are pink 615, yellow 620, light green 625, dark green 630, blue 635, and red, with red being the border color for the main camera. On the map shown in FIG. 6, the six cameras are color coded in the same manner as for the spatial video player display. Video streams from these cameras are also displayed near their corresponding cameras on the map. In this example the video stream borders are not color coded. The video streams displayed to the map are partial video streams, cropped to show the most amount of activity or items of interest in the video stream. Thus, the main camera 640 color coded red corresponds to partial video stream 645 and the main video stream display 610. The main camera 640 is emphasized by displaying an enlarged dot, circle and arrow. Camera 650 color coded pink corresponds to partial video stream 652 and player video stream 615. Camera 654 color coded yellow corresponds to partial video stream 656 and player video stream 620. Camera 660 color coded light green corresponds to partial video stream 662 and player video stream 625. Camera 670 color coded dark green corresponds to partial video stream 672 and player video stream 630. Camera 692 color coded blue corresponds to partial video stream 696 and player video stream 635.

In embodiments, the player and map can be displayed in any relation to each other. In embodiments, the map can be displayed without video streams or with one or more video streams. In embodiments, cropped keyframes, sample images or video streams can be displayed to the map. In embodiments, any combination of dots, circles, arrows, shading, color coding, enlarging or other types of distinguishing marks can be used to indicate or emphasize cameras on the map. In embodiments, video streams can be distinguished by color or in ways other than by color.

In embodiments, any combination of video streams, keyframes and sample images can be displayed on the map or player. In addition, a keyframe or sample image from the main camera video stream can be displayed instead of the video stream in display 110. In embodiments, video streams or keyframes from the main camera are not shown in the video streams or keyframes other than the main video stream or keyframe. In embodiments, a timeline is displayed. In embodiments, times are displayed within the video streams or keyframes.

Interaction with Camera View Display

Users such as security personnel can browse between video cameras by clicking on any of the video streams of the temporal and geographic displays described above, such that the main playing video stream is switched to the camera and playback position corresponding to the video stream selected. Users can select cameras by clicking on map video streams or on traditional camera bank video streams shown in FIG. 7. Using this technique, users can follow activity from camera view to camera view. This technique can be used in addition to skipping to a different playback position using traditional means of interacting with video players. For example, the user can still use play/pause buttons or select positions on a timeline, and the system automatically updates the camera views chosen for the temporal and geographic display accordingly.

In the spatial display, when changing the camera view, the movement of video streams to their new positions is animated to keep users oriented. Rather than animating streams along straight lines, they are animated around the perimeter of the main view to indicate the view rotation. Video streams are predominately rotated in the same direction, either clockwise or counter clock-wise, to indicate the view rotation. On occasion, a video stream might be rotated in the opposite direction from the majority of video streams to reduce the travel distance of the video stream. The animation duration depends on the distance video streams have to travel to avoid very fast or slow movement.

Figure 7:
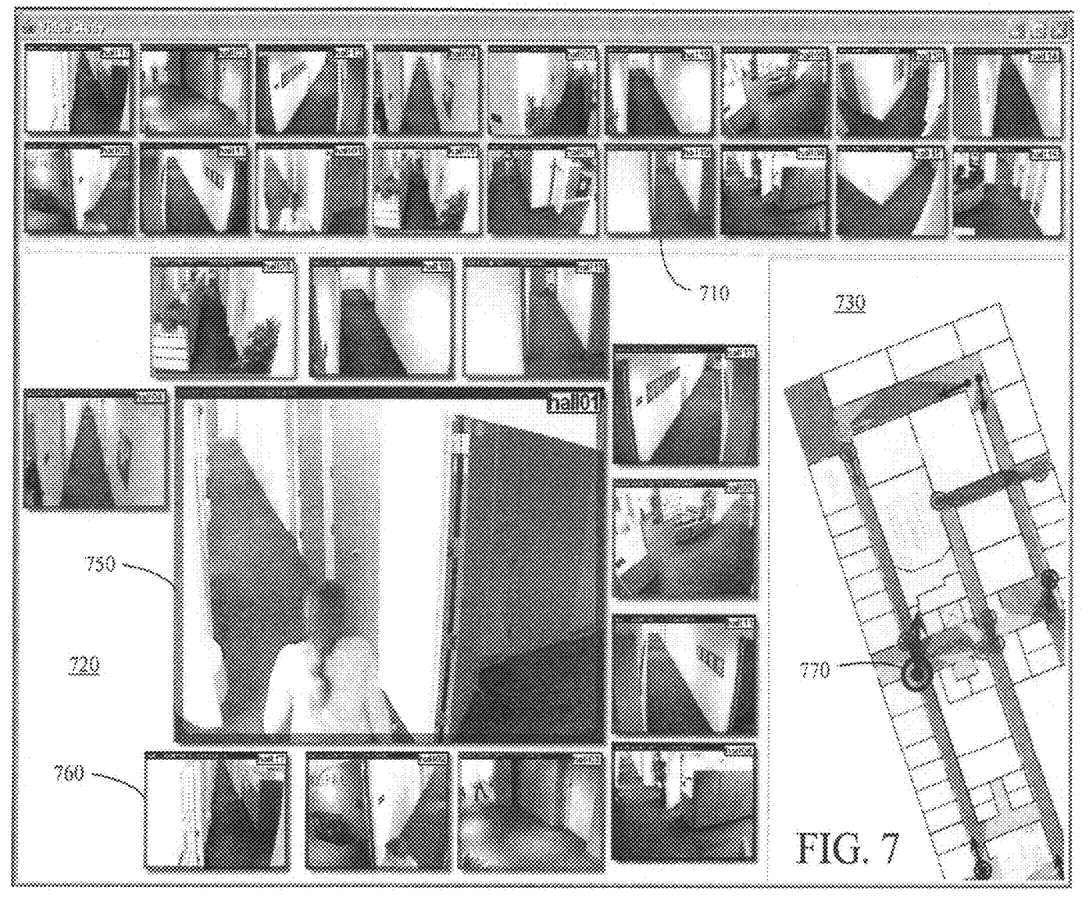
FIG. 7 shows an example complete configuration of a spatial video player display, including a map providing a spatial overview of cameras that is rotated and centered to the view of a camera selected by a user, according to embodiments.

FIG. 7 shows an example complete configuration of a spatial video player display, including a map providing a spatial overview of cameras that is rotated and centered to the view of a camera selected by a user, according to embodiments. The example FIG. 7 shows a complete configuration of the player partially depicted in FIG. 6. In addition, FIG. 7 shows video streams from all available cameras, such that the video streams are displayed as a traditional bank of cameras 710. This bank of cameras 720 is shown at the top, the spatial video player display 720 in the lower left, and a rotating spatial map of camera positions 730 in the lower right. Normally, the camera bank would not be needed for a tracking task because the tracked person should appear in one of the video streams 760 surrounding the main video stream display 750. However, if the tracked person completely disappears from view, either by entering an area not covered by a camera or because the user selected the wrong camera, the camera bank might be the only means to reacquire the tracked person.

The map 730 shown in FIG. 7 provides a spatial overview of cameras that is rotated and centered to the view of a camera selected by a user. The map is the same type of map as in FIG. 5. The user can select a camera view to be the main camera video by either clicking on a camera on the map or on a video stream in the spatial video display. The map is then automatically rotated and centered to the camera view and playback position from newly selected camera. The new camera view's direction is toward the top. The rotating map is intended to keep the user oriented and to simulate the rotation of a paper map. In FIG. 7, the newly selected camera 770 and its view are shown in purple. The video stream 750 of the newly selected camera view is also being shown on the spatial video display.

Map movement can be animated to keep the user oriented while the map is rotating and being centered to a new viewpoint of the newly selected camera. The animation duration of map movement can be synchronized to the rotation animation of the spatial display.

In embodiments, the map, the display and the bank can be displayed in any position relative to each other. In embodiments, keyframes or video stream sample images can be displayed instead of video streams. In embodiments, any combination of video streams, keyframes and sample images can be displayed.

In embodiments, video streams, keyframes or sample images can also be displayed near corresponding source cameras on the map. In this case, a user can select a camera to be the main camera showing a video stream by clicking on any camera or any keyframe displayed on the map.

Figure 8:
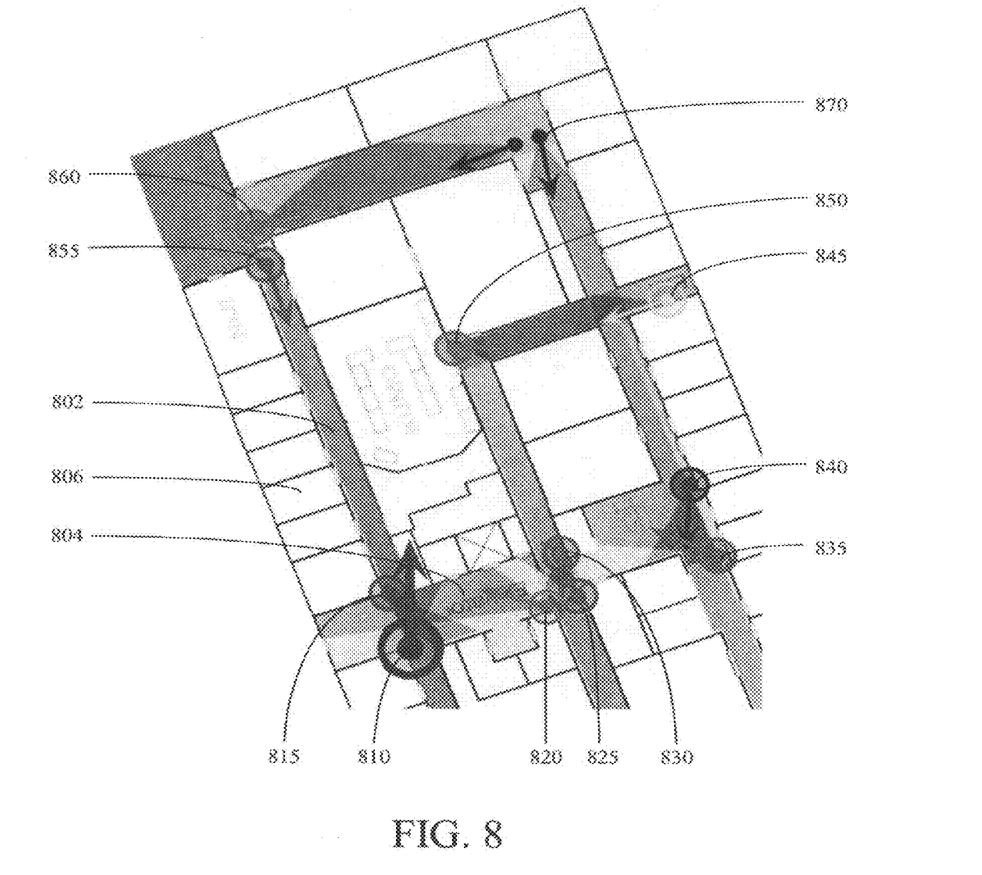
FIG. 8 shows an example map providing a spatial overview of cameras that is rotated and centered to the view of a camera selected by a user, according to embodiments.

FIG. 8 shows an example map providing a spatial overview of cameras that is rotated and centered to the view of a camera selected by a user, according to embodiments. The map shows an office building floor with hallways 802, common areas 804, as well as offices and other rooms 806. This rotated map shows a larger view of a map similar to the map in FIG. 7. The main camera 810 corresponding to the main video stream shown in a video or spatial display is shown as a dot in purple. The main camera is further emphasized by enlarging its dot, arrow and field of view. The field of view for the main camera points to the top of the display. Ten other cameras were selected for this display, light blue camera 815, tan camera 820, dark pink camera 825, green camera 830, light blue camera 835, dark blue camera 840, yellow camera 845, light pink camera 850, dark red camera 855, and light red camera 860. For all cameras on the map, including those not selected for display such as camera 870, a camera's location is shown as a dot on the map, while the camera's field of view is shown as a shaded area. Further, a camera's view direction is emphasized and indicated by an arrow. The ten cameras other cameras besides the main camera selected for the display are emphasized by displaying their dots with circles around them, and by color coding their dots, circles and arrows.

In embodiments the player supports viewing live or recorded video and can seamlessly switch from one to the other. Recorded video can be watched at different speeds and in reverse.

System Hardware, Software and Components

The present invention can be conveniently implemented using a conventional general purpose or a specialized digital computer or microprocessor programmed according to the teachings of the present disclosure, as will be apparent to those skilled in the computer art.

Appropriate cameras, such as Axis IP cameras, can be used to capture video streams and provide access to video as Motion JPEG via HTTP or as MPEG-4 via RTP. Motion JPEG is simpler to process, however, and supports seeking to different times. Further Motion JPEC does not require a dedicated codec, or data stream encoder/decoder, on the client side, and thus a Java client could be built that animates video player windows. The video streams can be recorded at different resolutions. Both live and recorded video are served from a digital video recorder as Motion JPEG via HTTP. The server can support several video players and is mostly limited by hard disk latency when different video players access recorded video at different times.

Appropriate software coding can readily be prepared by skilled programmers based on the teachings of the present disclosure, as will be apparent to those skilled in the software art. Included in the programming or software of the general/specialized computer or microprocessor are software modules for implementing the teachings of the present invention. The present invention can also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the features presented herein. The storage medium can include, but is not limited to, any type of disk including floppy disks, optical discs, DVDs, CD-ROMs, microdrives, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Various embodiments include a computer program product that can be transmitted in whole or in parts and over one or more public and/or private networks wherein the transmission includes instructions and/or information, which can be used by one or more processors to perform any of the features presented herein. In various embodiments, the transmission can include a plurality of separate transmissions.

Stored on any one of the computer readable medium (media), the present invention includes software for controlling both the hardware of the general purpose/specialized computer(s) and/or microprocessor(s), and for enabling the computer(s) and/or microprocessor(s) to interact with a human user or other mechanism utilizing the results of the present invention. Such software may include, but is not limited to, device drivers, operating systems, user interfaces and applications. Ultimately, such computer readable media further includes software for performing embodiments of the present invention.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems.

The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. Other features, aspects and objects of the invention can be obtained from a review of the figures and the claims. It is to be understood that other embodiments of the invention can be developed and fall within the spirit and scope of the invention and claims. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system configured to provide a display of video from multiple cameras, the system comprising:
   one or more processors; and
   one or more memory devices storing one or more programs for execution by the one or more processors, the one or more programs configured for simultaneously displaying:
   a first interface portion to display a main video stream captured by a main camera;
   one or more additional interface portions to display video streams that are temporally related to the displayed main video stream as video stream displays, wherein at least some of the video streams are captured by a set of cameras, wherein the video stream displays corresponds to one or more of:
      a first set of video playback positions from a first segment of time in each of their respective video streams at the time of the main video stream;
      a second set of video playback positions from a second segment of time in each of their respective video streams prior to the time of the main video stream; and
      a third set of video playback positions from a third segment of time in each of their respective video streams after the time of the main video stream; and
   a map that shows respective camera positions for the set of cameras and respective angles of view for the set of cameras overlaid on a floor plan of an area associated with the views of a plurality of the cameras.

2. The system of claim 1, wherein a video stream associated with one of the one or more video stream displays becomes the main video stream displayed to the interface with a corresponding video playback position when a user clicks on the video stream display.

3. The system of claim 1, wherein one or more of the video stream displays are static keyframes, wherein a keyframe is a representative video frame from a video stream near the time of the video stream's video playback position.

4. The system of claim 3, wherein a keyframe is a representative video frame from a video stream sequence having the most activity within one of the first, second and third segments of time.

5. The system of claim 4, wherein the video stream sequence that has the most activity comprises the largest number of pixels that change between video frames in the sequence.

6. The system of claim 1, wherein:
   the second set of video playback positions are from a first fixed point in time in each of their respective video streams prior to the time of the video stream of the main camera; and
   the third set of video playback positions are from a second fixed point in time in each of their respective video streams after the time of the video stream of the main camera.

7. The system of claim 1, wherein color coding of video stream displays in the interface display identifies video stream source cameras.

8. The system of claim 1, wherein the video streams are displayed next to their corresponding source cameras on the map.

9. The interface system of claim 8, wherein the cameras and their corresponding angles of view displayed to the map are color coded to match video stream display color coding displayed to the interface that identifies source cameras.

10. The system of claim 1 wherein the video stream displays associated with the second and third sets of video playback positions are each displayed within a band on opposite edges, respectively, of the main video stream display.

11. The system of claim 10, further comprising a timeline displayed next to the bands and the main video stream display.

12. The system of claim 1, wherein the multiple cameras have fixed view directions.

13. The system of claim 1, wherein the multiple cameras perform one or more of pan, tilt and zoom when the interface displays live video streams.

14. The system of claim 1, wherein the set of cameras is in spatially proximity to the main camera.

15. The system of claim 1, wherein the video stream displays associated with the first, second, and third sets of video playback positions further comprise an assessment of one or more of activity within the video streams, motion close to points of interest in the space being videotaped and events from infrared motion sensors, face detection and radio frequency identification.

16. The system of claim 1, wherein:
   video stream displays associated with the first, second, and third sets of video playback positions are displayed to the interface in spatial relation to the displayed video stream from the main camera,
   the spatial relation corresponds to relative physical positions of each of a set of cameras to the physical position of the main camera, and
   the video stream displays are from video streams of a set of cameras that are closest to the main camera.

17. The system of claim 16, wherein the video stream displays are animated to rotate around the new main video stream to their new positions spatially related to the new main video stream.

18. The system of claim 16, wherein:
   a video stream associated with one of the one or more video stream displays becomes the main video stream displayed to the interface with a corresponding playback position when a user clicks on the video stream display; and
   the map is animated to show rotation of the map as it is centered to a new viewpoint of the newly selected camera that corresponds to the new main video stream displayed to the interface.

19. The system of claim 18, wherein the animation of the map is synchronized to animated video stream displays that are rotated around the new main video stream to their new positions spatially related to the new main video stream.

20. The system of claim 16, wherein the closeness of each of the set of cameras to the main camera is determined in accordance with the average or the sum of distances between one or more focal points between each of the set of cameras and the main camera.

21. The system of claim 16, wherein the spatial relation of a video stream display to the main video stream display is determined in accordance with the angle formed by a line from a focal point of the main camera to a focal point of the camera corresponding to the video stream display and a line from the focal point of the main camera to the main camera, wherein each video stream display is displayed at the determined angle in relation to the main video stream display.

22. A method for providing a display of video from multiple cameras, the method comprising:

at a system comprising one or more processors, and one or more memory devices storing one or more programs for execution by the one or more processors:
selecting a video stream captured by a main camera as a main video stream;
selecting video streams captured by a set of cameras that are temporally related to the displayed main video stream, the selecting comprising one or more of:
selecting a first set of playback positions from a first segment of time in each of their respective video streams at the time of the main video stream;
selecting a second set of playback positions from a second segment of time in each of their respective video streams prior to the time of the main video stream; and
selecting a third set of playback positions from a third segment of time in each of their respective video streams after the time of the main video stream; and
simultaneously displaying:
a first interface portion to display the main video stream;
one or more additional interface portions to display the selected video streams in temporal relation to the display of the main video stream; and
a map that shows respective camera positions for the set of cameras and respective angles of view for the set of cameras overlaid on a floor plan of an area associated with the views of a plurality of the cameras.

23. The method of claim 22, wherein selecting video streams further comprises:
selecting video streams captured by a set of cameras that are closest to the main camera.

24. The method of claim 23, wherein displaying to one or more additional interface portions comprises:
displaying the selected video streams in spatial relation to the displayed main video stream, wherein the spatial relation corresponds to relative physical positions of each of a set of cameras to the physical position of the main camera.

25. A non-transitory computer readable medium storing one or more programs for execution by a computer, the one or more programs comprising instructions for:
selecting a video stream captured by a main camera as a main video stream;
selecting video streams captured by a set of cameras that are temporally related to the displayed main video stream, the selecting comprising one or more of:
selecting a first set of playback positions from a first segment of time in each of their respective video streams at the time of the main video stream;
selecting a second set of playback positions from a second segment of time in each of their respective video streams prior to the time of the main video stream; and
selecting a third set of playback positions from a third segment of time in each of their respective video streams after the time of the main video stream; and simultaneously displaying:
a first interface portion to display the main video stream;
one or more additional interface portions to display the selected video streams in temporal relation to the display of the main video stream; and
a map that shows respective camera positions for the set of cameras and respective angles of view for the set of cameras overlaid on a floor plan of an area associated with the views of a plurality of the cameras.

26. The non-transitory computer readable medium of claim 25, wherein selecting video streams further comprises:
selecting video streams captured by a set of cameras that are closest to the main camera.

27. The non-transitory computer readable medium of claim 26, wherein displaying to one or more additional interface portions comprises:
displaying the selected video streams in spatial relation to the displayed main video stream, wherein the spatial relation corresponds to relative physical positions of each of a set of cameras to the physical position of the main camera.

28. The system of claim 1, wherein the set of cameras includes the main camera.

29. The system of claim 1, wherein displaying the first interface portion, the one or more additional interface portions, and the map includes overlaying the first interface portion and the one or more additional interface portions over the map.

30. The system of claim 1, wherein one or more respective cameras in the set of cameras are selected based on spatial relation between the one or more respective cameras in the set of cameras and the main camera.

31. The system of claim 30, wherein the one or more respective cameras in the set of cameras are selected in accordance with the angle formed by a line from a focal point of the main camera to a focal point of a respective camera and a line from the focal point of the main camera to the main camera.

32. The method of claim 22, wherein the set of cameras includes the main camera.

33. The method of claim 22, wherein displaying the first interface portion, the one or more additional interface portions, and the map includes overlaying the first interface portion and the one or more additional interface portions over the map.

34. The method of claim 22, wherein one or more respective cameras in the set of cameras are selected based on spatial relation between the one or more respective cameras in the set of cameras and the main camera.

35. The method of claim 34, wherein the one or more respective cameras in the set of cameras are selected in accordance with the angle formed by a line from a focal point of the main camera to a focal point of a respective camera and a line from the focal point of the main camera to the main camera.

36. The non-transitory computer readable medium of claim 25, wherein the set of cameras includes the main camera.

37. The non-transitory computer readable medium of claim 25, wherein displaying the first interface portion, the one or more additional interface portions, and the map includes overlaying the first interface portion and the one or more additional interface portions over the map.

38. The non-transitory computer readable medium of claim 25, wherein one or more respective cameras in the set of cameras are selected based on spatial relation between the one or more respective cameras in the set of cameras and the main camera.

39. The non-transitory computer readable medium of claim 38, wherein the one or more respective cameras in the set of cameras are selected in accordance with the angle formed by a line from a focal point of the main camera to a focal point of a respective camera and a line from the focal point of the main camera to the main camera.

* * * * *

UNITED STATES PATENT AND TRADEMARK OFFICE
CERTIFICATE OF CORRECTION

| | | |
|---|---|---|
| PATENT NO. | : 8,274,564 B2 | Page 1 of 1 |
| APPLICATION NO. | : 11/580775 | |
| DATED | : September 25, 2012 | |
| INVENTOR(S) | : Girgensohn et al. | |

It is certified that error appears in the above-identified patent and that said Letters Patent is hereby corrected as shown below:

In column 15, line 66, please delete "interface";

In column 16, line 15, please delete "spatially" and insert -- spatial --.

Signed and Sealed this
Thirteenth Day of November, 2012

David J. Kappos
*Director of the United States Patent and Trademark Office*